UNITED STATES PATENT OFFICE.

ALFRED MOLHANT, OF MONS, BELGIUM.

FERMENTATION PROCESS.

1,124,500. Specification of Letters Patent. Patented Jan. 12, 1915.

No Drawing. Application filed May 14, 1913. Serial No. 767,536.

*To all whom it may concern:*

Be it known that I, ALFRED MOLHANT, a subject of the King of Belgium, residing at Mons, Belgium, have invented new and useful Improvements in Fermentation Processes, of which the following is a specification.

This invention has reference to improvements in fermentation processes and is intended more particularly for bringing about the fermentation of molasses or other fermentable liquids under such conditions that the wash constituting the residue of their distillation may be evaporated without incrusting the tubular apparatus which is employed for this purpose.

It is known that the usual operation for sulfuric acidification of mash or wort, particularly when the liquids are charged with earthy alkaline salts, brings about incrustation which interferes with the normal working; on the other hand, hydrochloric acidification obviates that difficulty but necessitates the employment of considerable quantities of hydrochloric acid, and this occasions very serious inconvenience on several grounds but more particularly because the acid rapidly attacks the whole of the apparatus; finally, working with hydrochloric acid in the usual way necessitates strong acidity in hydrochloric acid to obviate the overrunning of the liquid in fermentation by numerous bacteria which diminish considerably the output of alcohol.

In order to attain the object aimed at, *i. e.* the obviation of any incrustation of the evaporating apparatus, working with hydrochloric acid would be perfect if the operation could be carried out with very small doses of acid and if microbian infection could be prevented in these conditions. I have found as the result of many experiments that a yeast or ferment of a pure or composite stock acclimatized to hydrochloric acid, added at the same time as the liquid which it has caused to ferment to the molasses or other alkaline fermentable liquid, diluted so as to obtain a reaction almost neutral to turnsol, so that the mixture is only slightly acid, enables the fermentation of sugar juices to be carried right to the end without bringing about infection. This result can only be obtained if the ferment which is forced to live in a medium acidified by hydrochloric acid has been itself accustomed to increasing doses of formic aldehyde. A ferment acclimatized to formic aldehyde by preliminary cultures in a medium to which small doses of formic aldehyde are added until the critical dose is arrived at, then transferred into a hydrochloric medium, and thence into an almost neutral medium, has the interesting property that it offers a considerable resistance to bacterial invasion.

The process described obviates all the difficulties referred to. Mash or wort fermented with a yeast or ferment that has been subjected to the treatment described yields a wash that can be concentrated without any difficulty. My process has other advantages in that it obviates the denitration and sterilization necessary in the process hitherto followed.

What I claim as my invention and desire to secure by Letters Patent is:—

1. The process of producing a yeast for use in the fermentation of molasses and other fermentable liquids consisting in preliminarily cultivating the yeast in a medium treated with formic aldehyde, and then transferring the culture together with said medium into another medium acidified by the addition thereto of hydrochloric acid.

2. A yeast for use in the fermentation of molasses and other fermentable liquids comprising a culture acclimatized to formic aldehyde and mixed with a medium containing hydrochloric acid.

In testimony whereof I have signed my name to this specification in the presence of two subscribing witnesses.

ALF. MOLHANT.

Witnesses:
J. GHYSER,
S. V. LOURALL.

Copies of this patent may be obtained for five cents each, by addressing the "Commissioner of Patents Washington, D. C."